United States Patent
Im

(10) Patent No.: US 10,138,029 B2
(45) Date of Patent: Nov. 27, 2018

(54) CONTAINER LID HAVING MEASURING FUNCTION

(71) Applicant: Hyobin Im, Anyang-si (KR)

(72) Inventor: Hyobin Im, Anyang-si (KR)

( * ) Notice: Subject to any disclaimer, the term of this patent is extended or adjusted under 35 U.S.C. 154(b) by 0 days.

(21) Appl. No.: 15/511,887

(22) PCT Filed: Nov. 22, 2016

(86) PCT No.: PCT/KR2016/013486
§ 371 (c)(1),
(2) Date: Mar. 16, 2017

(87) PCT Pub. No.: WO2017/095056
PCT Pub. Date: Jun. 8, 2017

(65) Prior Publication Data
US 2017/0297779 A1 Oct. 19, 2017

(30) Foreign Application Priority Data

Dec. 3, 2015 (KR) .................. 10-2015-0171105
Mar. 4, 2016 (KR) .................. 10-2016-0026200

(51) Int. Cl.
B65D 41/26 (2006.01)
B65D 41/04 (2006.01)
G01F 19/00 (2006.01)

(52) U.S. Cl.
CPC ............. B65D 41/26 (2013.01); B65D 41/04 (2013.01); G01F 19/00 (2013.01)

(58) Field of Classification Search
CPC .. B65D 41/26; B65D 41/265; B65D 41/0407; B65D 41/0435; B65D 41/04;
(Continued)

(56) References Cited

U.S. PATENT DOCUMENTS

2011/0000915 A1* 1/2011 Kamath ............... B65D 1/0246
220/288
2015/0166224 A1* 6/2015 Greiner-Perth .... B65D 47/2068
222/153.06

FOREIGN PATENT DOCUMENTS

JP 53-119248 U 9/1978
JP 09-301407 A 11/1997
(Continued)

OTHER PUBLICATIONS

Translation of JP3771091, Feb 17, 2006, Paragraphs 4, 14, and 15.*
Translation of PCT/KR2016/013486, Mar. 3, 2017, p. 5.*

*Primary Examiner* — Robert J Hicks
(74) *Attorney, Agent, or Firm* — KORUS Patent, LLC; Seong Il Jeong

(57) ABSTRACT

According to an embodiment of the disclosed present invention, there is provided a container lid having a measuring function, including: a valve body configured to be mounted on the entrance of a container, and to have a through hole and a valve; and a cap configured to be screwed on the entrance, and to have a connection part; wherein the cap is placed in any one of a first position where the valve opens the through hole in the state where the connection part has been connected to the valve stem; a second position where the valve closes the through hole in the state where the connection part has been connected to the valve stem; and a third position where the connection part is removed from the valve stem and also the cap is separated from the container in the state where the valve has closed the through hole.

13 Claims, 17 Drawing Sheets

(58) Field of Classification Search
CPC .... B65D 41/06; B65D 51/1644; B65D 51/16; B65D 51/1683; G01F 19/00
USPC ..... 220/303, 293, 288, 212, 203.19, 203.01, 220/202, 203.29; 215/329, 314, 311, 307, 215/228
See application file for complete search history.

(56) References Cited

FOREIGN PATENT DOCUMENTS

| | | | |
|---|---|---|---|
| JP | 2003-128109 A | 5/2003 | |
| JP | 3771091 B2 * | 4/2006 | ............ B65D 47/20 |
| KR | 20-0410032 Y1 | 3/2006 | |
| KR | 10-0788760 B1 | 12/2007 | |

* cited by examiner (a)

(b)

(a)

(b)

(a)

(b)

(a)

(b)

CONTAINER LID HAVING MEASURING FUNCTION

TECHNICAL FIELD

The present invention relates to a container lid having a measuring function, which enables a predetermined quantity of contents to be accurately measured and used from contents in a container without a separate measuring cup or cap.

BACKGROUND ART

In daily life, there are a large number of cases where a determined quantity of contents need to be taken out of the contents accommodated in a container and then used. For example, there are many cases where a predetermined quantity of liquid or powder contents need to be taken from the contents accommodated in a container and then used, such as a case where cooking oil or various types of seasoning need to be measured upon cooking food, a case where a determined dose of liquid medicine needs to be taken, a case where a mouthwash needs to be taken into a cap and used to gargle the mouth, a case where a quantity of detergent or fabric softener suitable for the quantity of laundry needs to be taken from a container and then used, etc.

When measurement is required as described above, a method of taking contents from a container by tilting a container toward a measuring cup or a container cap on which graduations are printed or carved while observing the graduations with the eye has been used hitherto in most cases.

Meanwhile, according to a report, a survey found that, although a dose within a dose error range of 5% was considered to be a regular dose in regard to the taking of medicine, a dose error of 25.8% occurred in connection a measuring cup on which graduations were printed, and a dose error of 23.3% occurred in connection a measuring cup on which graduations were carved. In particular, most dose errors take the form of excessive doses, and thus the risk of overdoses is high. Furthermore, there are many cases where excessive quantities of detergent or fabric softener larger than appropriate quantities are used, and thus water is wasted and the excessive use becomes a cause of water contamination.

Since there are frequent cases where quantitative use is not sufficiently observed for the reason that measurement is inconvenient or inaccurate notwithstanding that quantitative use is required as described above, some schemes for improvement have been proposed.

Korean Patent Application Publication No. 2004-0023480 of "patent document 1" discloses an inner cap in which a cover part configured to open or close the outlet of a container is coupled to the upper end of the container, graduations configured to measure the quantity of contents of the cover part are marked, and a desired quantity of contents are discharged into the inside of the cover part and used in the state where the cover part has been opened. However, the inner cap of patent document 1 still has problems in that the quantity of contents discharged is not uniform due to viscosity and the like during a process of discharging contents into the cover part because the inner cup simply performs only the function of a measuring cup and in that accuracy is not ensured because measurement is made depending on the graduations.

Furthermore, Korean Utility Model Application Publication No. 1986-0009713 of "patent document 2" discloses a quantitative outflow lid. The lid of patent document 2 is configured such that an opening and closed valve functions as a check valve. Furthermore, when liquid contents are discharged from a container body, contents are discharged through a discharge hole having a small inner diameter by compressing the container body in the state where the lid has been opened and then a container has been tilted. However, the lid of patent document 2 has a problem in that measuring error is significant because the quantity of contents to be discharged is determined by the compressing force with which the container is compressed and thus a deviation resulting from the elasticity of the container body, the grasping power of a user, or the like is significant.

Furthermore, Korean Patent Application Publication No. 2004-0039224 of "patent document 3" discloses a cap that accommodates a check valve and has a contents storage space. However, patent document 3 employs a check valve simply for the purpose of enabling children or the elder to easily use a container because contents do not spill even when the container falls over, but does not take into account a quantitative outflow function.

PRIOR ART DOCUMENTS

Patent Documents (Patent document 1) Korean Patent Application Publication No. 2004-0023480
(Patent document 2) Korean Utility Model Application Publication No. 1986-0009713
(Patent document 3) Korean Patent Application Publication No. 2004-0039224

DISCLOSURE

Technical Problem

An object of the present invention is to provide a container lid that enables a predetermined quantity to be accurately measured without requiring measurement with the naked eye.

Another object of the present invention is to provide a container lid having a variable measuring function, which enables a measuring quantity to be changed as desired.

Still another object of the present invention is to provide a container lid that can measure contents without the need to compress a container with hands, thereby rarely generating a measuring deviation attributable to the type of container or a change of a user.

Yet another object of the present invention is to provide a container lid having a measuring function, which is not disposable, but can be repeated used for different containers.

Technical Solution

According to an embodiment of the present invention, there is provided a container lid having a measuring function, the container lid including: a valve body configured to be mounted on the entrance of a container, to have a through hole that communicates with the internal space of the container, and to have a valve that closes or opens the through hole; and a cap configured to be screwed on the entrance of the container, and to have a connection part that is connected to or separated from the valve stem of the valve; wherein the cap is placed in any one of a first position where the valve opens the through hole in the state where the connection part has been connected to the valve stem; a second position where the valve closes the through hole in the state where the connection part has been connected to the valve stem; and a third position where the connection part is removed from the valve stem and also the cap is separated from the container in the state where the valve has closed the through hole.

In this case, a protrusion is formed along the inner circumferential surface of the lower end of the cap, and a location where the protrusion comes into contact with a counterpart protrusion provided below the lowermost end thread of the screw portion on which the cap is screwed is the second position.

Furthermore, a thread-free portion without a thread over a predetermined length is formed in the middle of a thread provided on the inner circumferential surface of the cap, and a location where the cap is idly rotated due to the thread-free portion is the second position.

According to an embodiment of the present invention, there is provided a container lid having a variable measuring function, the container lid including: a valve body configured to be mounted on the entrance of a container, to have a first through hole that communicates with the internal space of the container, and to have a valve that closes or opens the first through hole; and an intermediate cap configured to be screwed on the entrance of the container, and to have a partition on which a connection part configured to be connected to or separated from the valve stem of the valve is formed, and to have a depressed variable measuring space that communicates with a second through hole formed in the partition; and a variable cap configured to be coupled to the intermediate cap so that the depth to which the variable cap is inserted into the variable measuring space is adjustable; wherein the intermediate cap is placed in any one of: a first position where the valve opens the first through hole in the state where the connection part has been connected to the valve stem; a second position where the valve closes the first through hole in the state where the connection part has been connected to the valve stem; and a third position where the connection part is removed from the valve stem and also the intermediate cap is separated from the container in the state where the valve has closed the first through hole.

In this case, at least any one of the intermediate cap and the variable cap is made of transparent material, and a graduated ruler indicative of measuring capacity corresponding to the depth to which the variable cap is inserted is marked on the outer circumferential surface or inner circumferential surface of the variable cap.

Advantageous Effects

The container lid of the present invention configured as described above has an advantage in that a designed quantity can be accurately and conveniently measured without measurement with the naked eye.

Furthermore, the container lid having a variable measuring function according to the present invention has an advantage in that a desired quantity can be changed and used within a designed capacity range.

Furthermore, when measurement is made, measurement is made using only gravity without the need to compress a container, and thus accurate measurement can be always made regardless of the type of container, or the age or gender of a user.

Moreover, even when a container needs to be discarded because contents are all consumed, only the container lid can be separated, fitted on a new container and then used, and thus an advantage arises in that the container lid can be semi-permanently used.

MODE FOR INVENTION

Preferred embodiments of the present invention will be described in detail below with reference to the accompanying drawings.

In the description of the embodiments of the present invention, descriptions of well-known configurations that will be apparent to those skilled in the art will be omitted in order to prevent the gist of the present invention from being made obscure.

Furthermore, in the following description of the present invention, in connect with upward and downward directions, a direction toward the entrance of a container will be referred to as an upward direction and a direction toward the bottom of the container will be referred to as a downward direction, based on the state where the container has been set upright. Furthermore, in a similar manner, the upright state of a container will be described as the container being set upright, the inverted state of a container will be described as the container being set upside down, and the tilted state of a container will be described as the container being set tilted.

Figure 1:
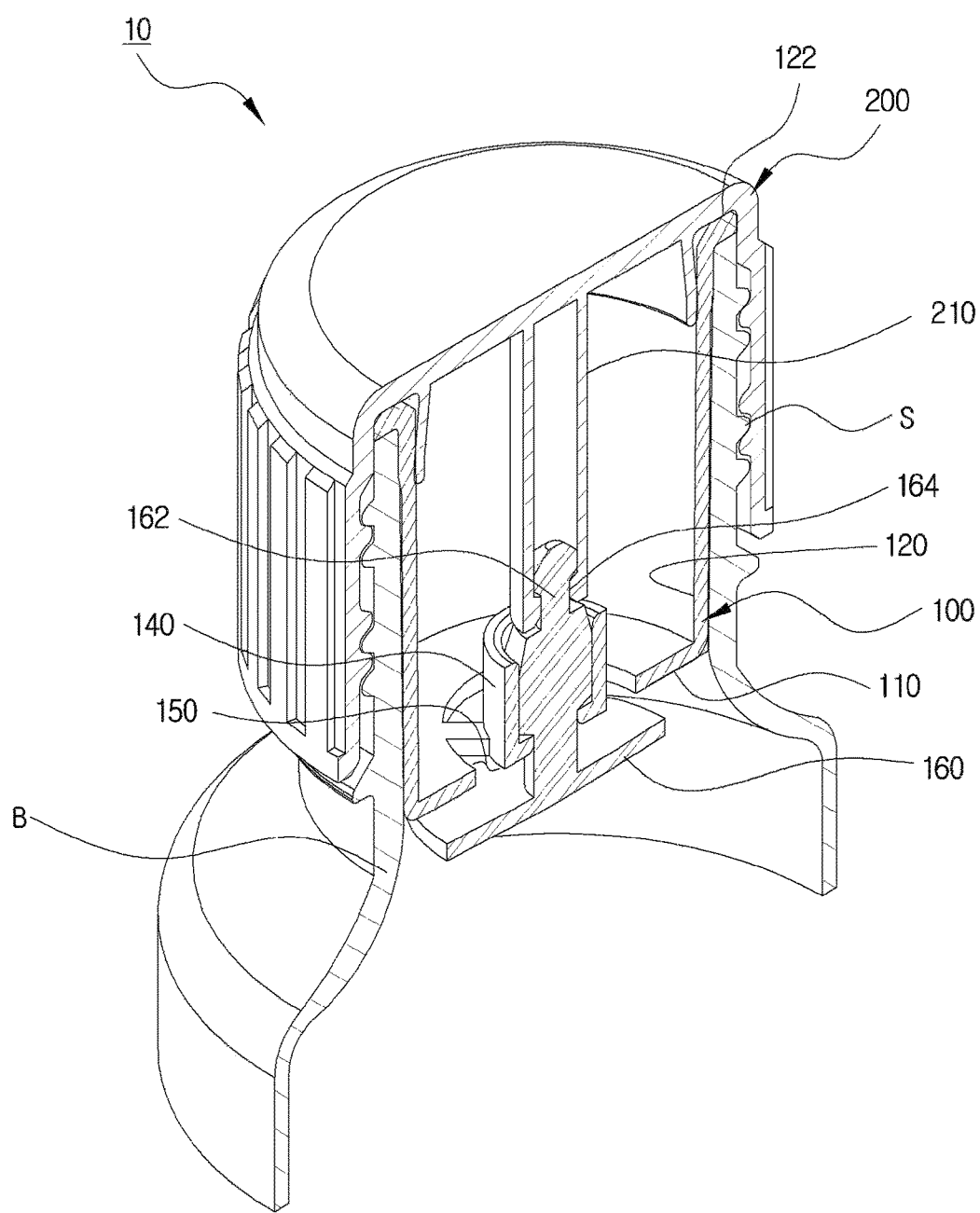
FIG. 1 is a cutaway perspective view showing a state where a container lid having a measuring function according to an embodiment of the present invention has been coupled to the entrance of a container.
Figure 2:
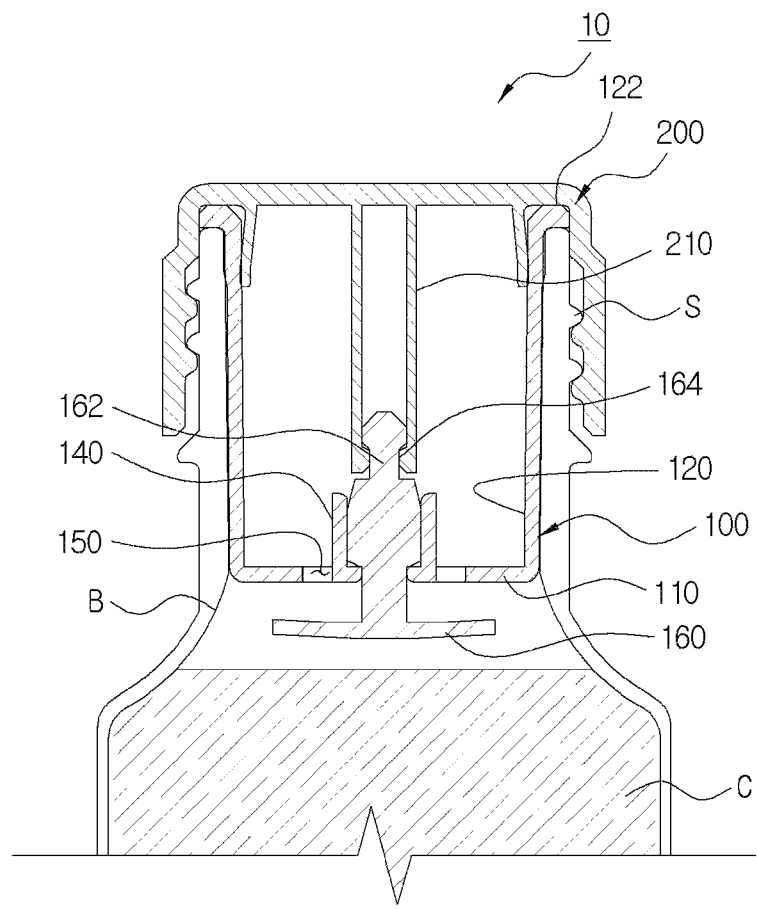
FIG. 2 is a sectional view showing the cutaway state of FIG. 1 flatways.

FIG. 1 is a cutaway perspective view showing a state where a container lid 10 having a measuring function according to an embodiment of the present invention has been coupled to the entrance of a container B, and FIG. 2 is a sectional view showing the cutaway state of FIG. 1 flatways. A detailed description will be given with reference to these drawings.

The container lid 10 having a measuring function that is provided by the present invention basically includes a valve body 100, and a cap 200.

The valve body 100 is mounted on the entrance of the container B so that the valve body 100 is located between the entrance of the container B and an internal space configured to accommodate contents C. The valve body 100 includes a through hole 150 configured to communicate with the internal space of the container B, and a valve 160 configured to open or close the through hole 150.

The structure of the valve body 100 is now described in greater detail. The valve body 100 includes: a disk-shaped bottom surface 110 configured to form a valve seat; a valve guide 140 configured to protrude from the bottom surface 110 to the entrance of the container B; the through hole 150 formed to pass through an area around the valve guide 140; and the valve 160 inserted into the valve guide 140. Accordingly, when the valve 160 inserted into the valve guide 140 is moved downward and thus separated from the bottom surface 110, the through hole 150 can be opened. In contrast, when the valve 160 is moved upward, a valve surface comes into contact with the bottom surface 110, i.e., a valve seat, and thus the through hole 150 can be closed. In this case, the valve 160 may be made of material having elasticity such as rubber material or soft plastic, and thus may smoothly come into tight contact with the bottom surface 110.

The cap 200 is a cover that is screwed on the entrance of the container B, and includes a connection part 210 configured to be connected to or separated from the valve stem 162 of the valve 160 inside the cap 200. In this case, the phrase "the cap 200 is screwed on the entrance of the container" refers to both a case where the cap 200 is screwed onto a screw portion S formed on the entrance of the container B and a case where the cap 200 is screwed onto a screw portion 124 formed on the outer circumferential surface of the valve body 100, which ultimately means that the distance between the cap 200 and the valve body 100 may be changed in response to the rotation movement by which the cap 200 is tightened or released.

Figure 3:
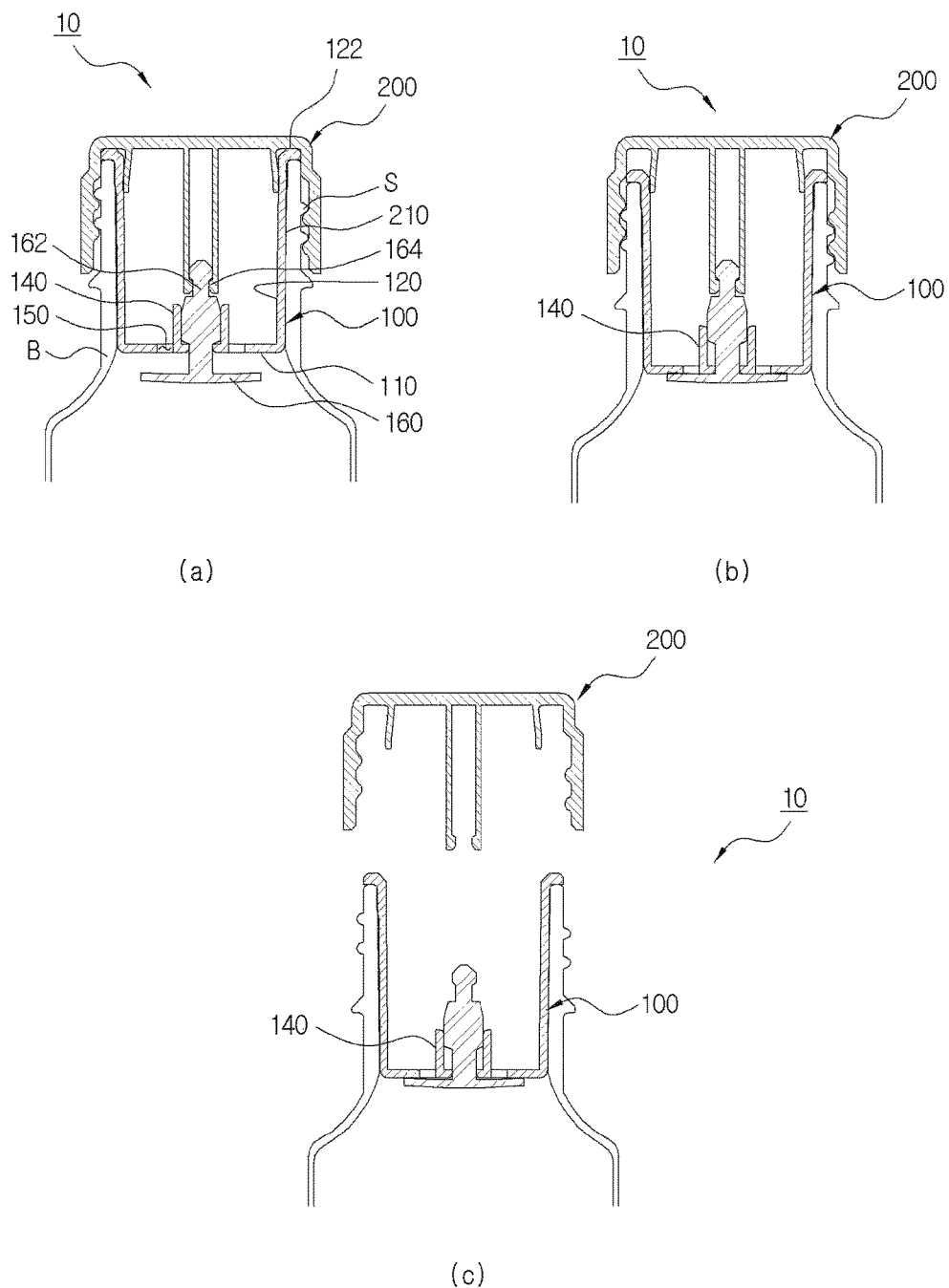
FIG. 3 is a view showing three coupling states of a connection part and a valve that are formed depending on the degree of tightening of a cap.

FIG. 3 is a view indicating that the mutual connection relationship between the connection part 210 of the cap 200 and the valve 160 of the valve body 100 is in three states depending on the degree of tightening of the cap 200, i.e., the distance between the cap 200 and the valve body 100.

First, FIG. 3(a) shows a state where the cap 200 has been completely tightened onto the entrance of the container B, i.e., a first position in which the cap 200 is placed at the lowermost location. In this first position, the connection part 210 of the cap 200 is connected to the valve stem 162 of the valve 160. The connection part 210 pushes the valve stem 162 downward, and thus the valve surface is separated from the bottom surface 110. In other words, the through hole 150 of the valve body 100 is in an open state.

Next, FIG. 3(b) shows a second position, which is a state where the cap 200 has been somewhat released. In this second position, although the connection part 210 of the cap 200 is still connected to the valve stem 162 of the valve 160, the valve stem 162 is pulled as the cap 200 is released and somewhat moved upward, and thus the valve surface and the bottom surface 110 enters a contact state. In other words, the cap 200 still maintains the sealed state of the container B, and the through hole 150 of the valve body 100 is in a closed state.

In regard to the relationship between the above-described first and second positions, the distance between the first and second positions is a distance corresponding to the stroke l of the valve 160. Although the cap 200 (in the second position) is released somewhat more than in the completely closed state (in the first position), this may be viewed as having been still screwed enough to seal the container B.

Finally, FIG. 3(c) shows a third position in which the cap 200 has been completely released and separated from the container B. In this case, as only the connection part 210 continues to be moved upward (be moved upward as the cap is released) in the state where the valve surface comes into contact with the bottom surface 110 and thus the valve 160 cannot be moved upward any more, the connection part 210 is separated from the valve stem 162. In other words, the third position is a state where the cap 200 is separated from the valve body 100 and the container B while the valve 160 maintains the state of closing the through hole 150.

Figure 4:
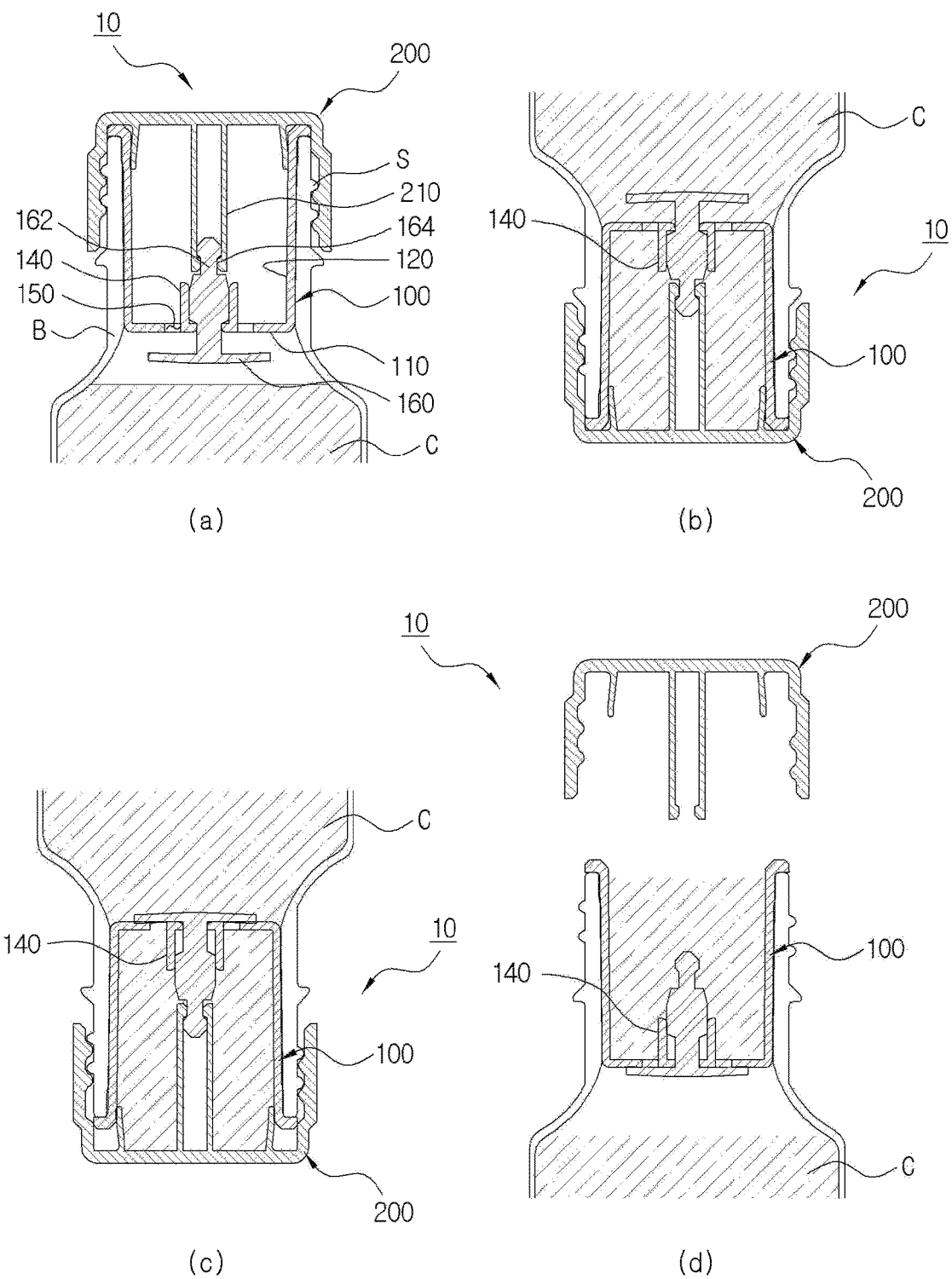
FIG. 4 is a diagram showing a series of steps of measuring container contents by using the container lid having a measuring function according to the embodiment of the present invention.

A principle or method for measuring the contents C of the container B by using changes among the three positions and coupling states shown in FIG. 3 is described with reference to FIG. 4 below.

First, as shown in FIGS. 4(a) and 4(b), when the cap 200 is sufficiently closed and placed in the first position and also the container B is set tilted or upside down, the contents C of the container B fully fill the internal space of the valve body 100 through the opened hole 150.

Furthermore, as shown in FIG. 4(c), when the cap 200 is somewhat released and placed in the second position in the state where the container B has been set tilted or upside down, the sealed state of the cap 200 is maintained and the through hole 150 is closed, and thus the contents C having fully filled the internal space of the valve body 100 is separately sealed inside a space independent of the container B.

Furthermore, as shown in FIG. 4(d), when the container B is set upright again and then the cap 200 is placed in the third position in which the cap 200 is completely opened, the contents C having fully filled the internal space of the valve body 100 are measured by the volume of the space, and enter an available state.

As described above, the container lid 10 of the present invention configured such that the cap 200 and the valve 160 can be placed in the above-described first to third positions, thereby implementing a measuring function. Accurate measurement is made possible only by the simple manipulation of filling the internal space of the valve body 100 with the contents C of the container B during a process of changing the position from the first position to the second position.

Furthermore, in the case where measurement is not required, for example, the case where appropriate quantities of oil continue to be discharged in order to make fried food, the through hole 150 may be opened by pushing the valve 160 with a finger or elongated object in the state where the cap 200 has been removed, and then the container B may be used.

Various embodiments of the present invention that impart additional advantages while implementing the above-described measuring function are described below.

Figure 5:
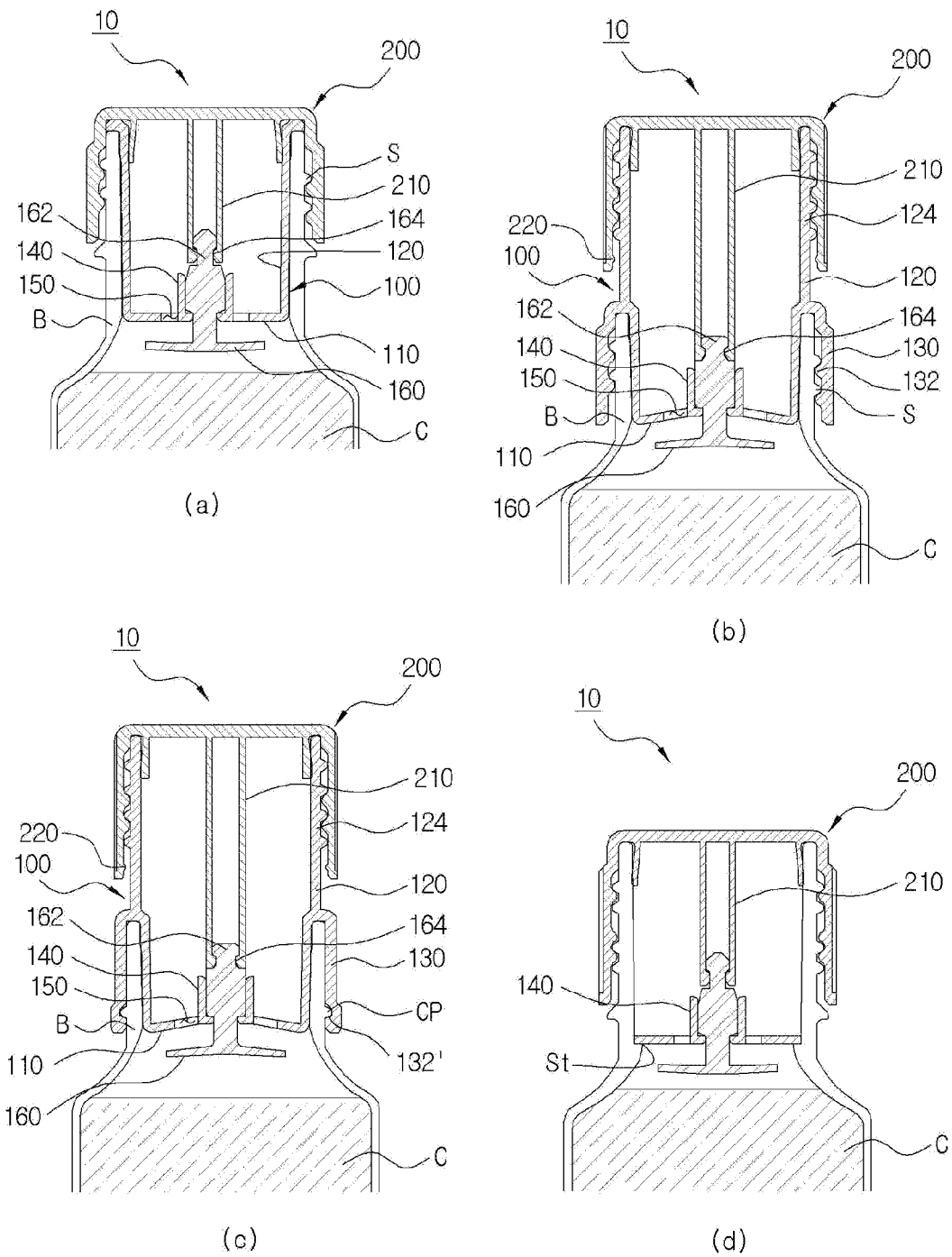
FIG. 5 is a diagram showing various embodiments of a valve body that is mounted on the entrance of a container.

FIG. 5 shows various embodiments of valve bodies 100 that are mounted on the entrances of containers B. In order to facilitate the comparisons between the differences between the embodiments, the respective embodiments are shown in FIGS. 5(a) to 5(d).

FIG. 5(a) shows an embodiment of a structure in which a valve body 100 further includes a cylindrical outer wall 120 extending from a bottom surface 110 and the cylindrical outer wall 120 is inserted and fastened into the inner circumferential surface of the entrance of a container B. In this embodiment, the cylindrical outer wall 120 is fastened inside the valve body 100 of the container B and thus is not exposed to the outside, and a cap 200 is engaged with the screw portion S of the container B itself provided on the entrance of the container B. Furthermore, a protrusion 122 is formed on the outer wall 120, and the protrusion 122 may be configured to be hung on the rim of the entrance of the container B.

Furthermore, FIG. 5(b) shows an embodiment in which a cylindrical outer wall 120 extending from the bottom surface 110 of a valve body 100 is provided in a similar manner and a second outer wall 130 configured to form an annular space that is opened downward (toward the bottom surface of the valve body) is additionally provided at the lower end of the outer wall 120. In other words, this structure of the valve body 100 is a structure in the valve body 100 is fastened by inserting the annular space, formed by the outer wall 120 and the second outer wall 130, over the rim of the container B.

In this embodiment, a second screw portion 132 to be engaged with a screw portion S provided on a container B itself is formed on the inner circumferential surface of the second outer wall 130 and performs screw engagement, and a first screw portion 124 to be engaged with a cap 200 is provided on the outer circumferential surface of the outer wall 120 exposed to the outside. In other words, the two screw portions 124 and 132 to be screwed on the container B and the cap 200, respectively, are provided on the valve body 100.

Furthermore, a modification of the embodiment of FIG. 5(b) is shown in FIG. 5(c). In this modified embodiment, a container B and a valve body 100 are coupled to each other by the catching of the protrusion, rather than screw coupling. In other words, a projection CP is formed on the entrance of the container B, a protrusion 132' is formed on the inner circumferential surface of a second outer wall 130, and the protrusion 132' of the second outer wall 130 passes over and is then caught on the projection CP of the container B.

Furthermore, FIG. 5(d) shows an embodiment in which a disk-shaped valve body 100 without a cylindrical outer wall 120 is directly supported onto a stepped protrusion St formed on the inner circumferential surface of the container B in the neck portion of the container B. It will be apparent that in this embodiment, a cap 200 is engaged with a screw portion S provided on the container B.

The embodiments of the coupling structures of the valve bodies 100 have their own advantages.

In the first and second embodiments, the valve bodies 100 can be attached to and detached from the containers B, and thus an advantage arises in that each of the container lids 10 of the present invention can be used for different containers B a plurality of times. From the point of view of a user, the embodiment of FIG. 5(b) in which the valve body 100 can be more easily removed may be more convenient.

Figure 6:
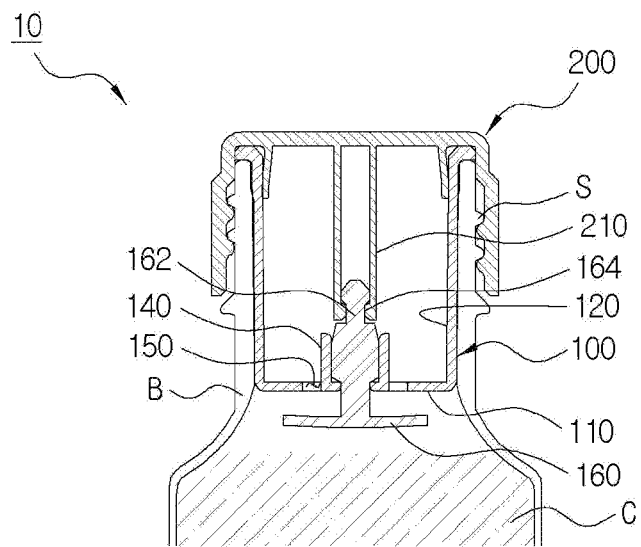
FIG. 6 is a diagram showing an embodiment in which the measuring capacity of a valve body is enlarged.
Figure 6:
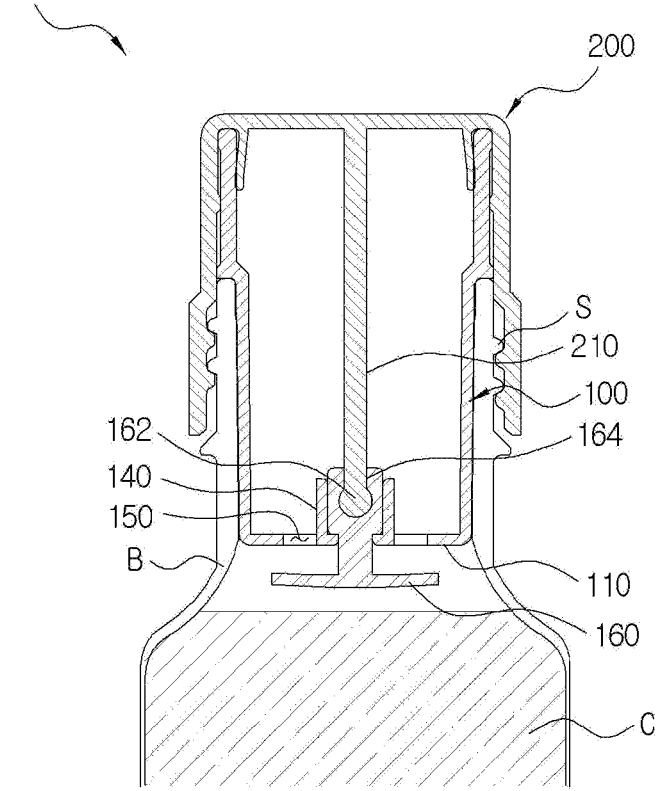

Another advantage resides in that as shown in FIG. 5(b) and as compared and shown in FIGS. 6(a) and 6(b), measuring capacity can be increased by increasing the length of the outer wall 120 (see FIGS. 5(b) and 6(b)). In other words, the embodiment of FIG. 2 is basically intended to measure the capacity that the entrance of the container B has. The measuring capacity may be increased by enlarging the internal space of the valve body 100 through the extension of the upper end of the outer wall 120 above the rim of the entrance of the container B.

Although not shown, it will be apparent that the outer wall 120 may be extended downward, rather than toward the entrance of the container B. However, when the valve body 100 is deeply extended into the inside of the container B, the through hole 150 is configured to be formed through the bottom surface 110, and thus a disadvantage arises only in that it is difficult to exhaustively measure and use the contents C inside the container B.

Furthermore, in the third embodiment of FIG. 5(c), the container lid 10 can be immediately coupled by applying force in the state of placing the container lid 10 on the entrance of the container B, and thus this embodiment is suitable for the case of mass production in which the container lid 10 is immediately applied to the container B and then placed on the market.

The fourth embodiment of FIG. 5(d) has a simple structure, and thus has the advantage of reducing manufacturing costs. However, this embodiment has disadvantages in that it is difficult for a user to directly recycle it and it is difficult to increase measuring capacity due to its design structure.

Figure 7:
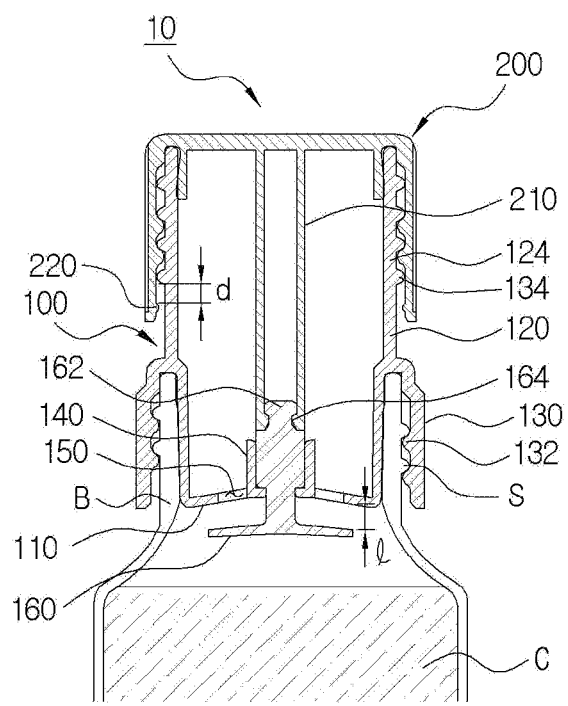
FIG. 7 is a diagram showing an embodiment that enables the closing of the valve of a valve body to be easily and immediately determined.
Figure 7:
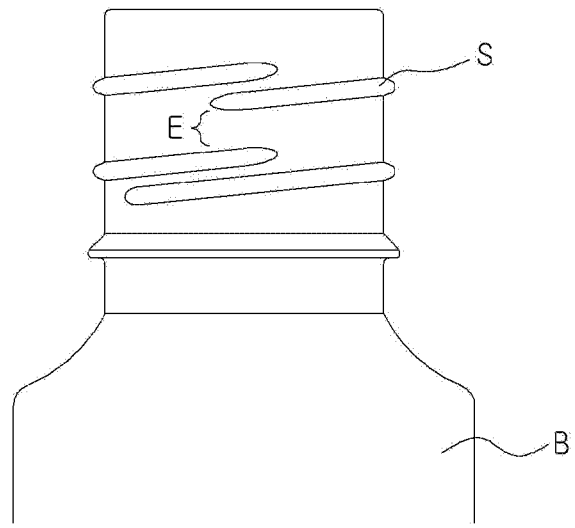

Meanwhile, FIG. 7 shows an embodiment that enables a user to easily determine that a cap 200 has reached the second position. As described with reference to FIG. 4, a measuring process is completed by closing a valve 160 by somewhat releasing the cap 200 in the state where the container B has been set tilted or upright. If a user releases the cap 200 above the originally designed second position, a sealed state is released and thus measured contents C may leak. It will be apparent that, although the user may appropriately release the cap 200 while observing a situation with the naked eye, this is considerably inconvenient. Furthermore, when the container B is opaque, the observation with the naked eye itself is impossible. Accordingly, if the user can be aware of having reached the second position only via the sensation of the hand, the above problem will be completely resolved. An embodiment provided for this purpose is shown in FIG. 7.

In FIG. 7(a), a protrusion 220 formed along the inner circumferential surface of the lower end of a cap 200 is provided at the lower end of the cap 200. The location of the protrusion 220 is designed such that the location where a counterpart protrusion 134 provided below the lowermost end thread of a screw portion S 124 (the screw portion of the container or the first screw portion of an outer wall) on which the cap 200 is screwed comes into contact with the protrusion 220 provided on the cap 200 lies on the second position. In other words, when the cap 200 is placed in the first position (the cap is tightly closed), the distance d between the protrusion 220 and the counterpart protrusion 134 is made to correspond to the stroke l of a valve 160.

When the protrusion 220 is formed at such a location, a user who is releasing the cap 200 can sense resistance occurring when the protrusion 220 collides with the counterpart protrusion 134. At this time, when the user sets the container B upright and continues to release the cap 200, the user can accurately measure the contents C without spilling the contents C.

Another embodiment is shown in FIG. 7(*b*). In this embodiment, a thread-free portion E without a thread over a predetermined length is formed in the middle of a thread formed along the inner circumferential surface of a cap 200. In this case, FIG. 7(*b*) shows a structure in which the thread-free portion E is formed in the middle of the thread S of a container B instead of the thread provided on the inner circumferential surface of the cap 200. The reason for this is merely that this can provide a better understanding than a structure in which a thread-free portion E is formed on the inside of the cap 200 and even the case where the thread-free portion E is formed in the middle of the thread S of the container B can exhibit the same effect due to the symmetry between female and male screws during screw coupling.

As described above, when the thread-free portion E reaches the screw portion screw portion S 124 of the container or the first screw portion of an outer wall during a process of releasing the cap 200, the cap 200 is idly rotated. Accordingly, when the thread-free portion E is formed such that the location where the cap 200 is idly rotated corresponds to the second position, a user may sense the idle rotation. In other words, the embodiment of FIG. 7(*b*) is an embodiment that enables the user to become aware that the cap 200 has been appropriately released through the sensing of the disappearance of resistance during a process of releasing the cap 200, unlike the case of FIG. 7(*a*). When idle rotation occurs in the process of releasing the cap 200, the user sets the container B upright again, and allows the cap 200 to be caught on the thread by somewhat pulling the cap 200.

Figure 8:
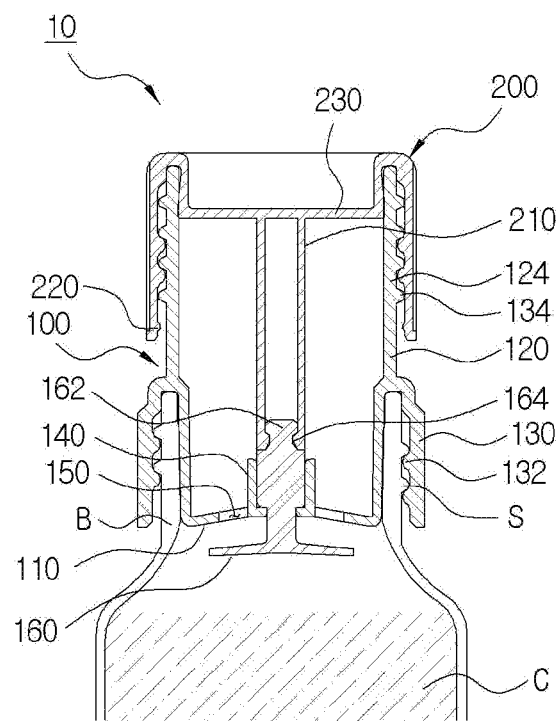
FIG. 8 is a diagram showing an embodiment in which a reserved space is formed in a measuring space inside a valve body.
Figure 8:
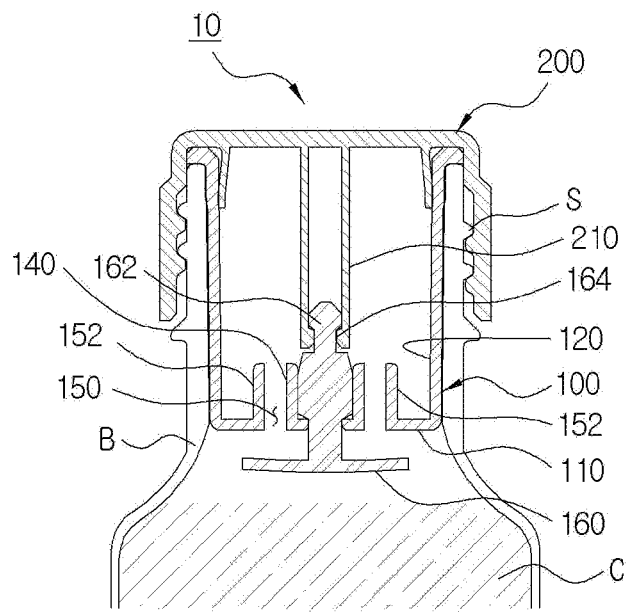

FIG. 8 is directed to an embodiment in which some dead space is formed in a measuring space inside a valve body 100. The reason for this is that it is useful to form some reserved space in the overall measurable space because there is concern that the contents C run off when the container B is moved for the purpose of use in the state where the contents C of the container B are measured to fully fill the space inside the valve body 100. It will be apparent that the volume obtained by subtracting the dead space from the overall measurable space corresponds to actually designed measuring capacity.

FIG. 8(*a*) shows an embodiment in which the upper surface of a cap 200 forms a depressed surface 230 that is formed toward the inside of the container B. Without need to describe it in detail, an internal space occupied by the depressed surface 230 of the upper surface of the container B becomes a dead space.

FIG. 8(*b*) shows an embodiment in which a pipe 152 that protrudes to a predetermined length while surrounding a through hole 150 is formed inside a valve body 100. In other words, based on the drawing, the pipe 152 that surrounds the through hole 150 is formed along a direction (an upward direction) in which a valve stem 162 is extended.

Figure 9:
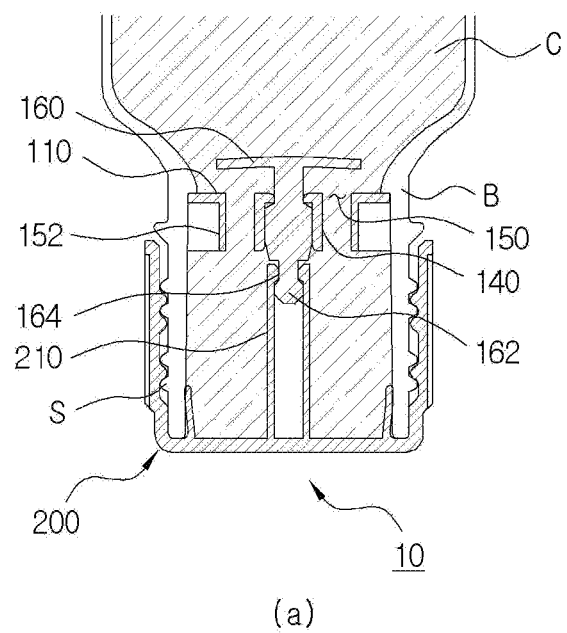
FIG. 9 is a diagram showing a state in which a reserved space has been formed according to the embodiment of FIG. 8(b)
Figure 9:
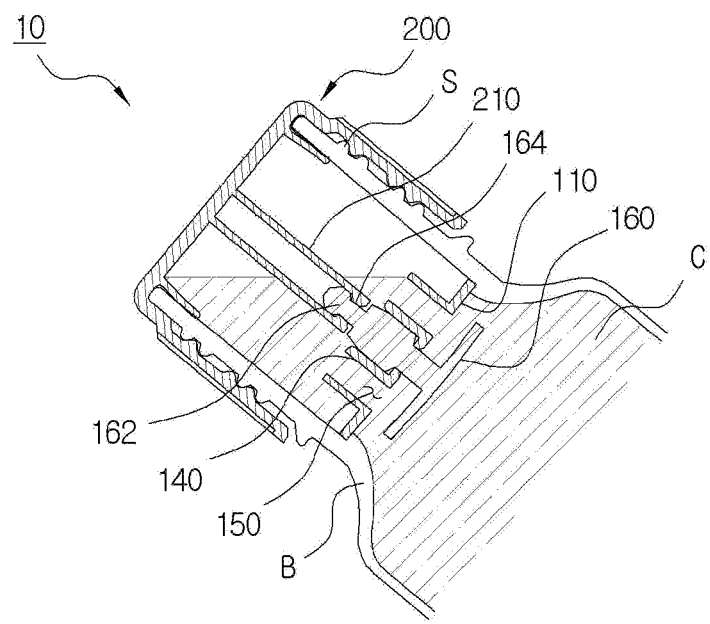

The embodiment of FIG. 8(*b*) is configured to form a dead space corresponding to the volume of residual air by intentionally allowing a predetermined amount of air to remain when the internal space of the valve body 100 is filled with the contents C by setting the container B tilted or upright. In other words, as shown in FIGS. 9(*a*) and 9(*b*), air remains in a cylindrical space corresponding to the height of the pipe 152 when the container B is set upright, and remains in the highest space above the pipe 152 when the container B is set tilted. Accordingly, a dead space is naturally formed during a process of performing measurement.

Figure 10:
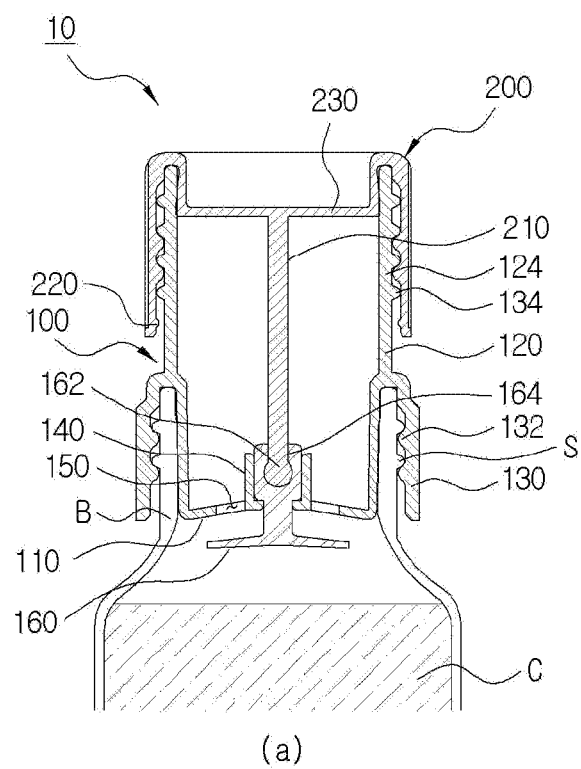
FIG. 10 is a diagram showing an embodiment of the coupling structure of a connection part and a valve stem.
Figure 10:
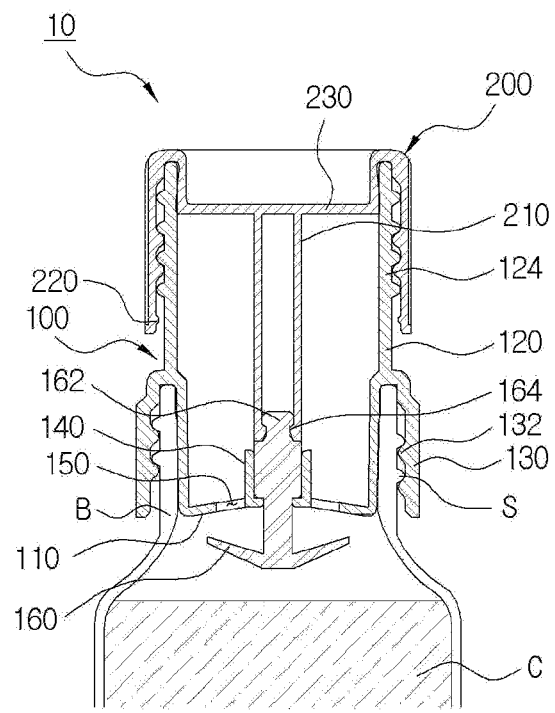

FIG. 10 shows an embodiment that enables a connection part 210 and a valve stem 162 to be easily connected to or separated from each other. As shown in this drawing, the connection part 210 and the valve stem 162 are configured to be connected to or separated from each other in such a manner that an undercut 164 is formed in the upper portion of the valve stem 162 and a shape corresponding to the undercut 164 is formed in the connection part 210. In this case, the connection part 210 may be formed in the shape of a rod or a hollow pipe, and accordingly the undercut 164 formed on the valve stem 162 is also formed on the inside or outside of the valve stem 162 (see FIGS. 10(*a*) and 10(*b*)).

Furthermore, as shown in FIG. 10(*b*), the valve surface of the valve 160 may be configured to be inversely tapered with respect to a bottom surface 110 that forms a valve seat. This is intended to help contents C having high viscosity, such as oil or detergent, easily enter a through hole 150 through the enlarging of a space between the bottom surface 110 and the valve surface.

Meanwhile, FIGS. 11 to 17 are diagrams showing a container lid 10 having a measuring function according to another embodiment of the present invention. This embodiment of the present invention is characterized by additionally imparting a variable measuring function to the above-described container lids 10 having a measuring function. In the following description of the embodiment of the container lid 10 having a variable measuring function, reference symbols are based on the reference symbols shown in FIGS. 11 to 17. If a different reference symbol is assigned to a component having the same name as the component of the above-described embodiments, the reference symbol shown in FIGS. 11 to 17 has priority.

Figure 11:
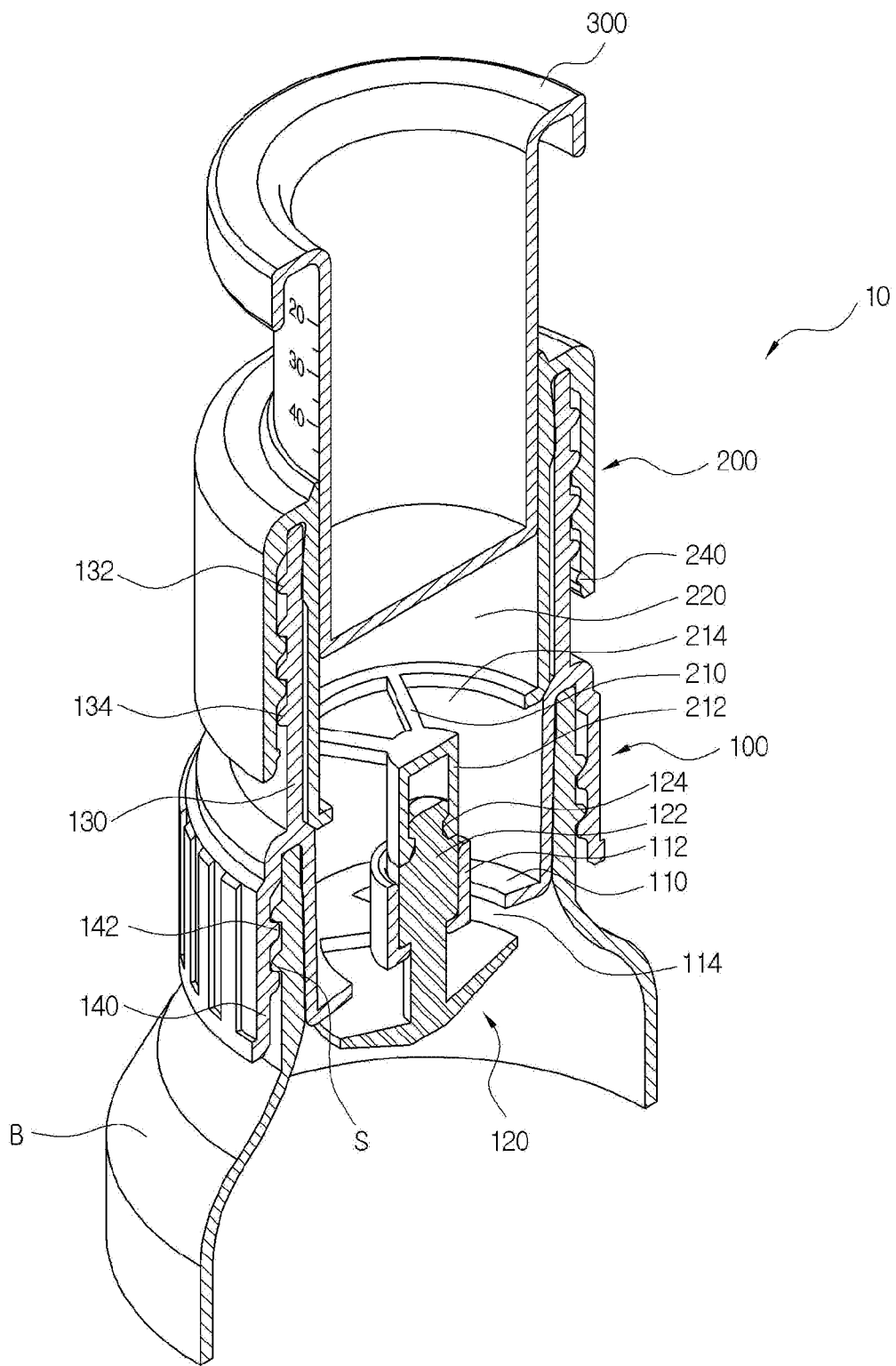
FIG. 11 is a cutaway perspective view showing a state where a container lid having a variable measuring function according to another embodiment of the present invention has been coupled to the entrance of a container.
Figure 12:
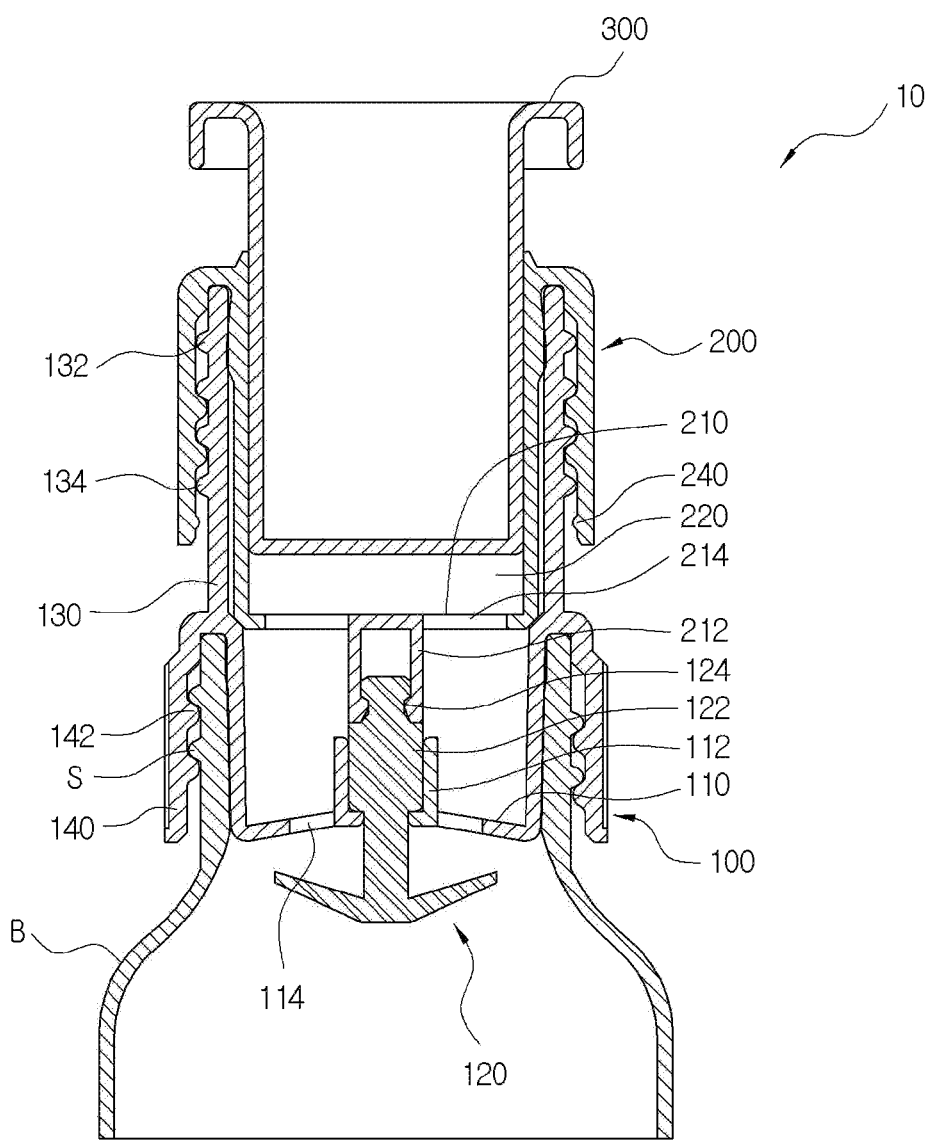
FIG. 12 is a sectional view showing the cutaway state of FIG. 11 flatways.

FIG. 11 is a cutaway perspective view showing a state where a container lid 10 having a variable measuring function according to the present invention has been coupled to the entrance of a container B, and FIG. 12 is a sectional view showing the cutaway state of FIG. 11 flatways. A detailed description will be given with reference to these drawings.

The container lid 10 having a variable measuring function that is provided by the present invention basically includes a valve body 100, an intermediate cap 200, and a variable cap 300.

The valve body 100 is mounted on the entrance of the container B accommodating contents C, and includes a first through hole 114 and a valve 120 configured to close or open the first through hole 114 communicating with the internal space of the container B. Although the second screw portion 142 of the valve body 100 is configured to be engaged with a screw portion S formed on the entrance of the container B in the shown embodiment, another coupling method may be used. For example, the valve body 100 may be coupled by a method of tightly fitting the valve body 100 over the inner circumferential surface of the entrance of the container B.

The structure of the valve body 100 is now descried in greater detail. The valve body 100 includes: a disk-shaped bottom surface 110 configured to form a valve seat; a valve guide 112 configured to protrude from the bottom surface 110 to the entrance of the container B; a first through hole 114 formed to pass through an area around the valve guide 112; and the valve 120 inserted into the valve guide 112. Accordingly, when the valve 120 inserted into the valve guide 112 is moved downward and thus spaced apart from the bottom surface 110, the first through hole 114 is opened (in a first position). In contrast, when the valve 120 is moved upward, a valve surface comes into tight contact with the bottom surface 110, i.e., a valve seat, and thus the first through hole 114 can be closed (in second and third positions). In this case, it is preferred that the valve 120 may be made of material having elasticity such as rubber material or soft plastic, and thus tight contact with the bottom surface 110 is maintained.

The intermediate cap 200 is a measuring member that is screwed on the entrance of the container B. The connection part 212 configured to be connected to or separated from the valve stem 122 of the valve 120 is provided below the partition 210 of the intermediate cap 200. In this case, the phrase "the intermediate cap 200 is screwed on the entrance of the container" refers to both a case where the intermediate cap 200 is screwed onto a screw portion S formed on the entrance of the container B and a case where the intermediate cap 200 is screwed onto a screw portion (a first screw portion) formed on the outer circumferential surface of the valve body 100, which ultimately means that the distance between the intermediate cap 200 and the valve body 100 may be changed in response to the rotation movement by which the intermediate cap 200 is tightened or released.

As described above, the intermediate cap 200 is a member that is responsible for an operation of opening or closing the valve 120 adapted to open or closes the first through hole 114 while moving among first to third positions to be described in detail later with respect to the valve body 100. The connection part 212 configured to be connected to or separated from the valve stem 122 is formed to protrude from the partition 210, forming the bottom of the intermediate cap 200, downward. A second through hole 214 similar to the first through hole 114 of the valve body 100 is formed in the partition 210 of the intermediate cap 200. A variable measuring space 220 configured to communicate with the internal space of the valve body 100 via the second through hole 214 is provided inside the intermediate cap 200 in the form of a cavity.

Furthermore, a variable cap 300 coupled to the intermediate cap 200 is provided such that the depth of insertion into the variable measuring space 220 of the intermediate cap 200 can be adjusted. The variable cap 300 is a member that can be vertically moved inside the variable measuring space 220. The volume of the variable measuring space 220 is varied depending on the location of the variable cap 300. In other words, the size of a space between the bottom surface of the variable cap 300 and the partition 210 of the intermediate cap 200 can be varied by adjusting the depth to which the variable cap 300 is inserted, which ultimately means that the capacity of an overall available space (measuring space) obtained by summing a space between the bottom surface 110 of the valve body 100 and the partition 210 of the intermediate cap 200 and a space between the partition 210 of the intermediate cap 200 and the bottom surface of the variable cap 300 is variable.

Figure 13:
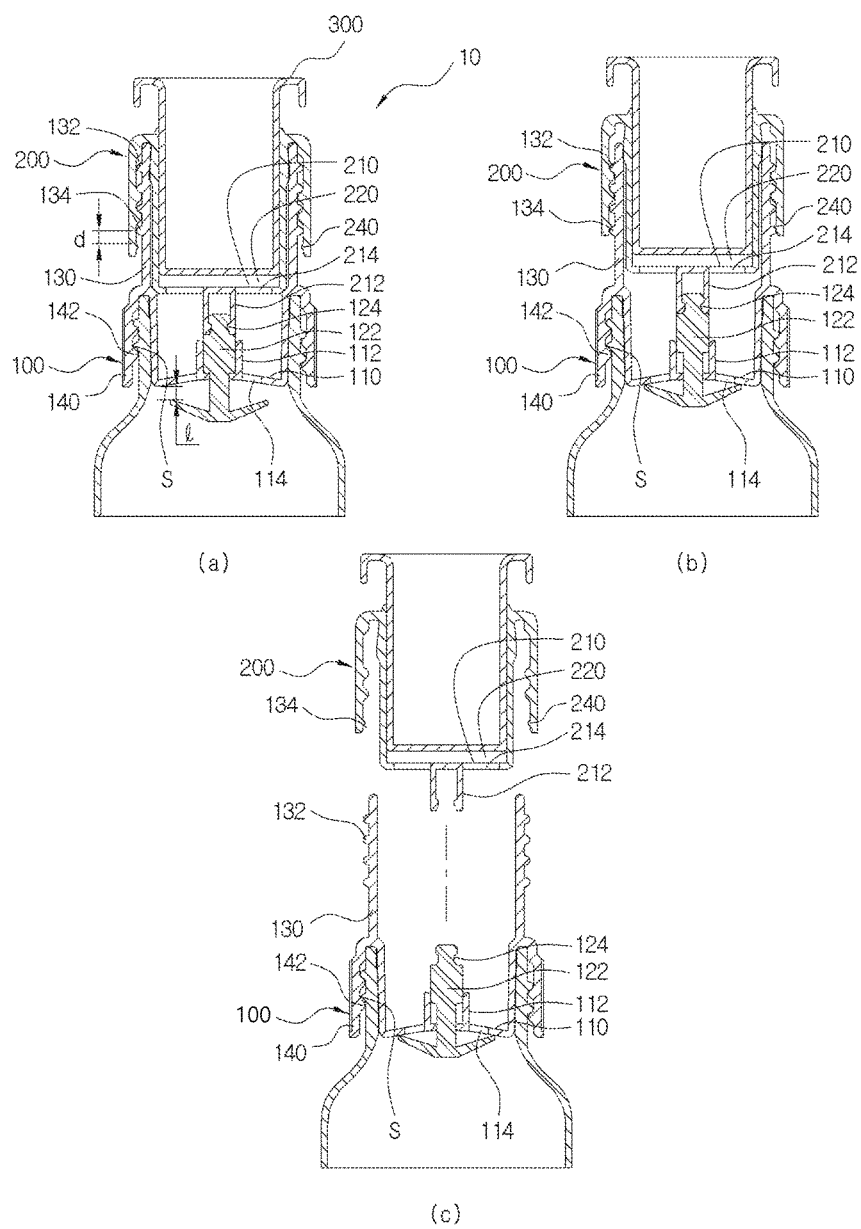
FIG. 13 is a view showing two coupling states of a connection part and a valve that are formed depending on the degree of tightening of an intermediate cap.

FIG. 13 is a view indicating that the mutual connection relationship between the connection part 212 of intermediate cap 200 and the valve 120 of the valve body 100 is in three states depending on the degree of tightening of the intermediate cap 200, i.e., the relative distance between the intermediate cap 200 and the valve body 100.

First, FIG. 13(a) shows a state where the intermediate cap 200 has been completely tightened onto the valve body 100, i.e., a first position in which the intermediate cap 200 is placed at the lowermost location. In this first position, the connection part 212 of the intermediate cap 200 is connected to the valve stem 122 of the valve 120. The connection part 212 pushes the valve stem 122 downward, and thus the valve surface is separated from the bottom surface 110. In other words, the through hole 114 of the valve body 100 is in an open state.

Next, FIG. 13(b) shows a second position, which is a state where the intermediate cap 200 has been somewhat released. In this second position, although the connection part 212 of the intermediate cap 200 is still connected to the valve stem 122, the valve 120 is pulled as the intermediate cap 200 is released and somewhat moved upward, and thus the valve surface and the bottom surface 110 are in a contact state. In other words, the intermediate cap 200 still continues to maintain the sealed state of the container B, and the through hole 114 of the valve body 100 is in a closed state.

Finally, FIG. 13(c) shows a third position in which the intermediate cap 200 has been completely released and separated from the container B. In this case, as only the connection part 212 continues to be moved upward (be moved as the intermediate cap is released) in the state where the valve surface comes into contact with the bottom surface 110 and thus the valve 160 cannot be moved upward any more, the connection part 212 is separated from the valve stem 122. In other words, the third position is a state where the intermediate cap 200 is separated from the valve body 100 and the container B while the valve 120 maintains the state of closing the first through hole 114.

In regard to the relationship between the above-described first and second positions, the distance d between the first and second positions is a distance corresponding to the stroke l of the valve 120. Although intermediate cap 200 (in the second position) is released somewhat more than that in the completely closed state (in the first position), this may be viewed as having been screwed enough to seal the container B.

Figure 14:
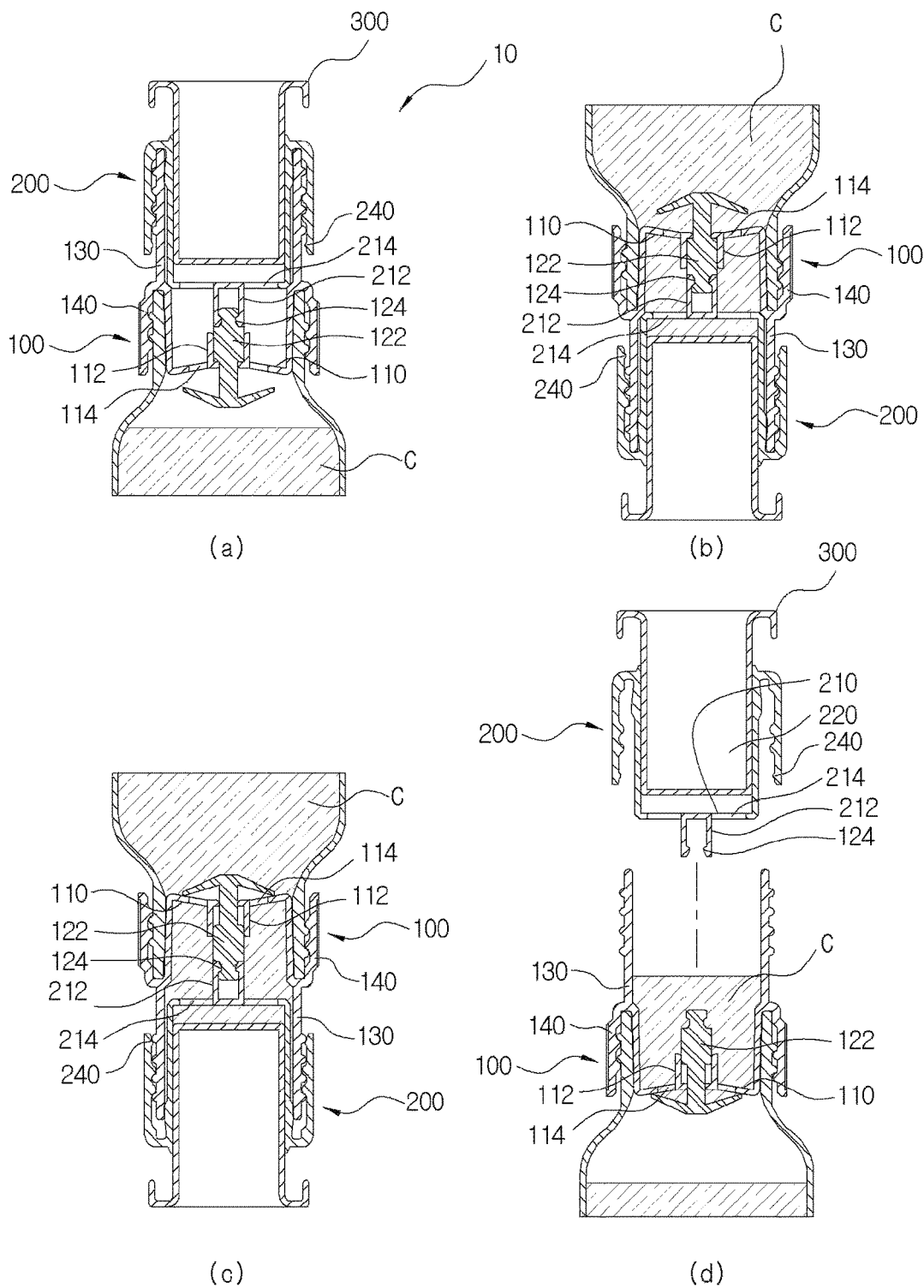
FIG. 14 is a diagram showing a series of steps of measuring container contents by using the container lid having a measuring function according to the other embodiment of the present invention.
Figure 15:
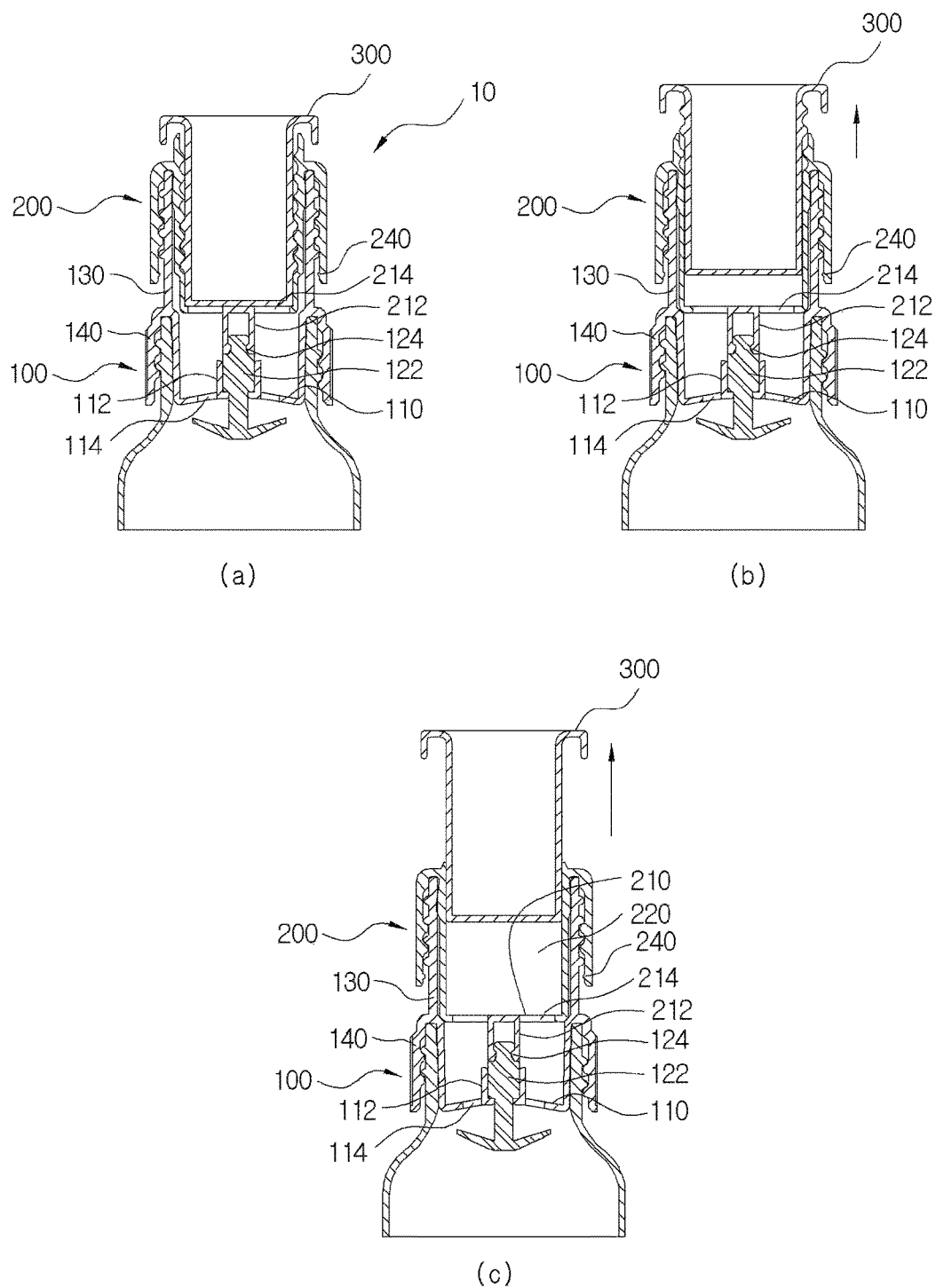
FIG. 15 is a diagram showing the comparison between three examples in which a measuring quantity has been changed.

A principle or method for measuring the contents C of the container B by using the changes in the position of the intermediate cap 200 (in the degree of tightening) shown in FIG. 13 is described with reference to FIG. 14.

First, as shown in FIGS. 14(a) and 14(b), when the container B is set tilted or upside down in the state where the intermediate cap 200 has been sufficiently closed and placed in the first position and also the variable cap 300 has been inserted into a desired depth (measuring capacity), the contents C of the container B fill the internal space of the valve body 100 through the opened first through hole 114, and come up to the bottom surface of the variable cap 300 through the second through hole 214 of the intermediate cap 200.

Furthermore, as shown in FIG. 14(c), when the intermediate cap 200 is somewhat released and placed in the second position in the state where the container B has been set tilted or upside down, the sealed state of intermediate cap 200 is maintained and the first through hole 114 is closed, and thus the contents C having fully filled the internal spaces of the valve body 100 and the variable measuring space 220 is separately sealed inside a space independent of the container B.

Moreover, as shown in FIG. 14(d), when the container B is set upright again and then the intermediate cap 200 is rotated to the third position and separated, the contents C having fully filled the internal space of the valve body 100 are measured by the volume of the space, and enter an extractable state.

As described above, the container lid 10 of the present invention enables the contents C having fully filled the internal spaces of the valve body 100 and the intermediate cap 200 to be separated from the container B through the simple manipulation of moving the valve 120 from the first position through the second position to the third position by rotating the intermediate cap 200 which changing the position of the container B, thereby enabling the contents C to be accurately measured and extracted.

Furthermore, the measuring space can be increased or decreased as desired by changing the depth to which the variable cap 300 is inserted into the variable measuring space 220 of the intermediate cap 200, i.e., the height of the bottom surface of the variable cap 300. The above-described control of the measuring space is shown as the three examples of FIG. 15.

FIG. 15(a) shows a state in which the variable cap 300 comes into tight contact with the partition 210 of the intermediate cap 200 and the second through hole 214 is blocked. In this case, the measuring space is limited to the internal space of the valve body 100, and thus the minimum quantity is measured. FIG. 15(c) shows a state in which the variable cap 300 reaches a limit height at which the sealing of the variable measuring space 220 can be maintained and thus the maximum quantity can be measured. FIG. 15(b) shows a state between the minimum quantity and the maximum quantity. Accordingly, the container lid 10 of the present invention enables a desired quantity between the minimum quantity and the maximum quantity to be measured as desired by controlling the location of the variable cap 300.

Meanwhile, in the case where measurement is not required, for example, the case where appropriate quantities of oil continue to be discharged in order to make fried food, the first through hole 114 may be opened by pushing the valve 120 with a finger or elongated object in the state where the intermediate cap 200 has been separated from the valve body 100 by moving the intermediate cap 200 to the third position, and then the container B may be used.

In this case, the configurations of the valve body 100 and the intermediate cap 200 shown in FIGS. 11 and 12 are described in greater detail below.

The valve body 100 includes a cylindrical outer wall 130 extended from the bottom surface 110 (a valve seat), and a second outer wall 140 configured to form an annular space that concentrically extends from a point below the upper end of the outer wall 130 downward and that is open downward (to a bottom surface). Furthermore, a first screw portion 132 to be engaged with the intermediate cap 200 is provided on the outer circumferential surface of the outer wall 130, and a second screw portion 142 to be engaged with the screw portion S of the entrance of the container B is provided on the inner circumferential surface of the second outer wall 140.

In other words, the structure of the valve body 100 is a structure in which the valve body 100 is fastened by inserting the rim of the container B into an annular space formed by the outer wall 130 and the second outer wall 140. Two screw portions 132 and 142 to be screwed on the container B and the intermediate cap 200 are provided on the valve body 100. The valve body 100 has a releasable coupling structure, and thus an advantage arises in that the container lid 10 of the present invention can be used for different containers B a plurality of times.

Furthermore, the intermediate cap 200 is coupled to the internal space of the outer wall 130 that is extended above the second outer wall 140. The intermediate cap 200 is also provided with an annular space in which a thread is formed on the inner circumferential surface thereof, like the valve body 100. The outer wall 130 of the valve body 100 is inserted and screwed into the annular space of the intermediate cap 200.

The variable measuring space 220 into which the variable cap 300 is inserted and coupled is formed inside the intermediate cap 200 by using the partition 210 as a boundary. In this case, at least any one of the intermediate cap 200 and the variable cap 300 may be made of transparent material so that the location of the variable cap 300 or whether the variable measuring space 220 has been fully filled with the contents C can be determined from the outside. In this case, the term "transparent" refers to not only completely transparent but also being capable of transmitting light enough to determine the location of the variable cap 300 and the contents C via the intermediate cap 200.

Furthermore, as shown in FIG. 11, it is preferred that graduated ruler 230 indicative of measuring capacity corresponding to the depth to which the variable cap 300 is inserted is marked on the outer circumferential surface or inner circumferential surface of the variable cap 300. For example, 20 ml is marked with a graduation and a numerical value as the minimum quantity when the variable cap 300 is located on the very bottom, and measuring capacities, including 30 ml, 40 ml, etc., are marked below 20 ml at equal intervals. Accordingly, a user can easily and accurately measure a desired quantity by adjusting the location of the variable cap 300 based on the graduated ruler 230.

The example of FIG. 11 shows an embodiment in which the graduated ruler 230 is engraved on part of the outer circumferential surface of the variable cap 300 and the graduated ruler 230 is used by setting the graduated ruler 230 to the boundary line of the upper end of the intermediate cap 200. In this case, the reason why the graduated ruler 230 is engraved on the outer circumferential surface of the variable cap 300 is that, since the intermediate cap 200 and the variable cap 300 are in tight contact with each other, there is concern that a graduated ruler 230 printed on the surface may be erased when the variable cap 300 is repeatedly pushed and pulled. If the graduated ruler 230 is marked on the inner circumferential surface of the variable cap 300, the graduated ruler 230 does not need to be engraved. However, it is necessary to use a material that does not react with the contents C and is safe for the human body.

Additionally, it will be apparent that it may be possible to mark the graduated ruler 230 throughout the overall outer circumferential surface or inner circumferential surface of the variable cap 300 so that the graduations can be observed regardless of the location.

Meanwhile, a method by which the variable cap 300 is coupled into the variable measuring space 220 of the intermediate cap 200 may be implemented in various forms. FIG. 15(a) shows an embodiment in which a thread is formed throughout the overall inner circumferential surface of the intermediate cap 200 and a counterpart thread is formed on the outer circumferential surface of the lower end of the variable cap 300. In other words, this embodiment corresponds to a structure in which vertical movement is performed by rotating the variable cap 300. In contrast, FIG. 15(c) shows a structure in which the inner circumferential surface of the intermediate cap 200 comes into tight contact with the outer circumferential surface of the variable cap 300 and is pulled up or pushed down with a hand, like the piston of a syringe. Furthermore, FIG. 15(b) corresponds to an intermediate form, and shows a structure in which the variable cap 300 is screwed to part of the upper end of the intermediate cap 200. When any of the above embodiments is applied, the location of the variable cap 300 can be adjusted in the same manner. The above individual embodiments indicate that various forms may be applied to be more advantageous for the maintenance of sealing based on the viscosity of the contents C of the container.

Figure 16:
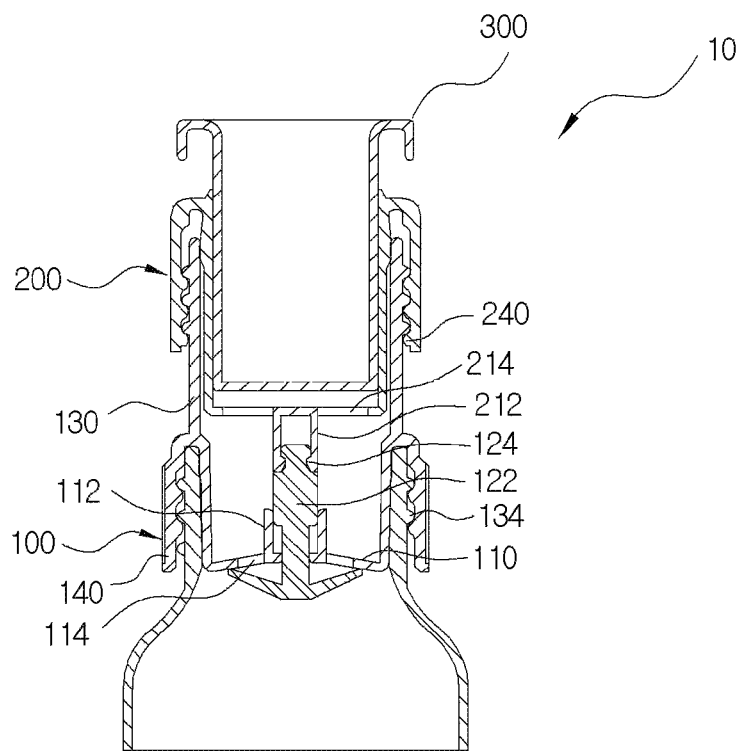
FIG. 16 is a diagram showing an embodiment that enables the closing of the valve of a valve body to be easily and immediately determined.
Figure 16:
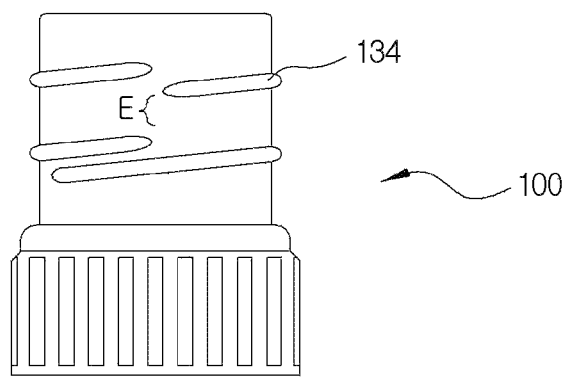

Meanwhile, FIG. 16 shows an embodiment that enables a user to easily become aware that the intermediate cap 200 has reached the second position. As described with reference to FIG. 14, a measuring process is completed by closing a valve 160 by somewhat releasing the intermediate cap 200 in the state where the container B has been set tilted or upright. If a user releases the cap 200 above the originally designed second position, a sealed state is released and thus measured contents C may leak. It will be apparent that, although the user may appropriately release the cap 200 while checking the location of the value 120 with the naked eye, this is considerably inconvenient. Furthermore, when the container B is opaque, the checking with the naked eye itself is impossible. Accordingly, if the user can be aware of having reached the second position only via the sensation of the hand, the above problem will be completely resolved. An embodiment provided for this purpose is shown in FIG. 16.

In FIG. 16(a), a protrusion 240 formed along an inner circumferential surface outside the lower end of the annular space of an intermediate cap 200 is provided at the lower end of the annular space of the intermediate cap 200, a counterpart protrusion 134 is provided below the lowermost end thread of the first screw portion 132 of the valve body 100 on which the intermediate cap 200 is screwed, and the locations of the protrusion 240 and the counterpart protrusion 134 are designed such that the location wherein the two protrusions 134 and 240 come into contact with each other lies in the second position when the intermediate cap 200 is rotated. In other words, when the intermediate cap 200 is placed in the first position (the intermediate cap is tightly closed), the distance d between the protrusion 240 and the counterpart protrusion 134 is made to correspond to the stroke l of a valve 120.

When the protrusion 220 is formed at such a location, a user who is releasing the cap 200 can sense resistance occurring when the protrusion 220 collides with the counterpart protrusion 134. At this time, when the user sets the container B upright and continues to release the cap 200, the user can accurately measure the contents C without spilling the contents C.

When the two protrusions 134 and 240 are formed to be placed at the above locations, a user who is releasing the intermediate cap 200 can sense resistance occurring when the protrusion 240 collides with the counterpart protrusion 134. This state is a state where the valve 120 is closed. Accordingly, in the case where the user senses the resistance, when the user sets the container B upright and continues to release the variable cap 300, the user can accurately measure the contents C without spilling the contents C.

Another embodiment is shown in FIG. 16(b). In this embodiment, a thread-free portion E without a thread over a predetermined length is formed in the middle of any one side thread by which the intermediate cap 200 and the valve body 100 are screwed on each other. In this case, FIG. 16(b) shows a structure in which the thread-free portion E is formed in the middle of the first thread of a valve body. The reason for this is merely that this can provide a better understanding than a structure in which a thread-free portion E is provided and the thread-free portion E formed on either side can exhibit the same effect due to the symmetry between female and male screws during screw coupling.

As described above, when the thread-free portion E appears during a process of releasing the intermediate cap 200, the intermediate cap 200 is idly rotated. Accordingly, when the thread-free portion E is formed such that the location where the intermediate cap 200 is idly rotated corresponds to the second position, a user may sense the idle rotation. In other words, the embodiment of FIG. 16(b) is an embodiment that enables the user to become aware that the intermediate cap 200 has been appropriately released through the sensing of the disappearance of resistance during a process of releasing the intermediate cap 200, unlike the case of FIG. 7(a). When idle rotation occurs in the process of releasing the cap 200, the user sets the container B upright again, continues to release the variable cap 300, and then use the container in the same manner.

Figure 17:
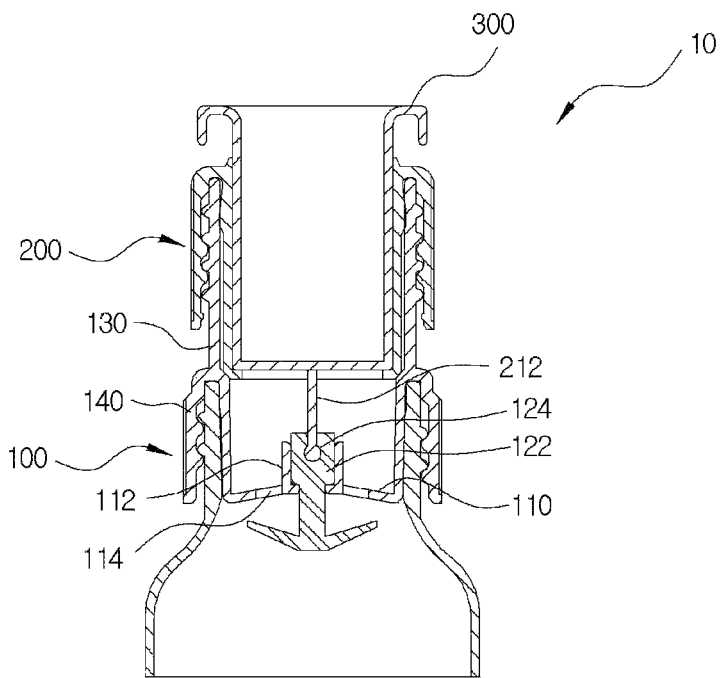
FIG. 17 is a diagram showing an embodiment of the coupling structure of a connection part and a valve stem.
Figure 17:
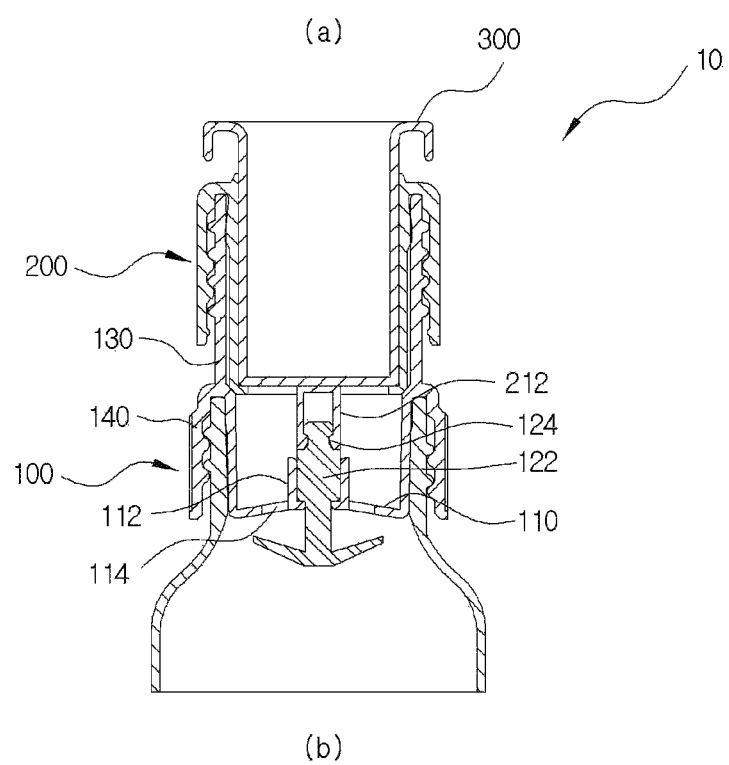

FIG. 17 shows an embodiment that enables a connection part 212 and a valve stem 122 to be easily connected to or separated from each other. As shown in this drawing, the connection part 212 and the valve stem 122 are configured to be connected to or separated from each other in such a manner that an undercut 124 is formed in the upper portion of the valve stem 122 and a shape corresponding to the undercut 124 is formed in the connection part 212. In this case, the connection part 212 may be formed in the shape of a rod or a hollow pipe, and accordingly the undercut 124 formed on the valve stem 122 is also formed on the inside or outside of the valve stem 122 (see FIGS. 17(a) and 17(b)).

Furthermore, the valve surface of the valve 120 may be configured to be inversely tapered with respect to a bottom surface 110 that forms a valve seat. This is intended to enable contents C having high viscosity, such as oil or detergent, to easily enter a first through hole 114 through the enlarging of a space between the bottom surface 110 and the valve surface.

DESCRIPTION OF REFERENCE SYMBOLS

10: container lid
100: valve body
110: bottom surface
120: outer wall
122: protrusion
124: first screw portion
130: second outer wall
132: second screw portion
132': protrusion
134: counterpart protrusion
140: valve guide
150: through hole
152: pipe
160: valve
162: valve stem
164: undercut
200: cap
210: connection part
220: protrusion
230: depressed surface
B: container
S: screw portion of the container
E: thread-free portion of thread
C: contents
St: stepped protrusion
CP: projection

The invention claimed is:

1. A container lid having a measuring function, the container lid comprising:
    a valve body configured to be mounted on an entrance of a container, to have a through hole that communicates with an internal space of the container, and to have a valve that closes or opens the through hole; and a cap configured to be screwed on the entrance of the container, and to have a connection part that is connected to or separated from a valve stem of the valve;
wherein the cap is placed in any one of: a first position where the valve opens the through hole in a state where the connection part has been connected to the valve stem; a second position where the valve closes the through hole in a state where the connection part has been connected to the valve stem; and a third position where the connection part is removed from the valve stem and also the cap is separated from the container in a state where the valve has closed the through hole,
wherein the valve body comprises a bottom surface configured to form a valve seat, a valve guide formed to protrude from the bottom surface toward the entrance of the container, the through hole formed to pass through an area around the valve guide, and the valve inserted into the valve guide,
wherein the valve body further comprises a cylindrical outer wall formed to extend from the bottom surface, the outer wall is inserted and fastened into an inner circumferential surface of the entrance of the container, and the cap is coupled to a screw portion of the entrance of the container.

2. The container lid of claim 1, wherein a protrusion is formed on the outer wall, and the protrusion is caught on a rim of the entrance of the container.

3. The container lid of claim 1, wherein a protrusion is formed along an inner circumferential surface of a lower end of the cap, and a location where the protrusion comes into contact with a counterpart protrusion provided below a lowermost end thread of the screw portion on which the cap is screwed is the second position.

4. The container lid of claim 1, wherein a thread-free portion without a thread over a predetermined length is formed in the middle of a thread provided on the inner circumferential surface of the cap, and a location where the cap is idly rotated due to the thread-free portion is the second position.

5. The container lid of claim 1, wherein an upper surface of the cap forms a depressed surface that is formed toward an inside of the container.

6. The container lid of claim 1, wherein a pipe that protrudes along a direction in which the valve stem extends while surrounding the through hole is formed.

7. A container lid having a measuring function, the container lid comprising:
a valve body configured to be mounted on an entrance of a container, to have a through hole that communicates with an internal space of the container, and to have a valve that closes or opens the through hole; and
a cap configured to be screwed on the entrance of the container, and to have a connection part that is connected to or separated from a valve stem of the valve;
wherein the cap is placed in any one of: a first position where the valve opens the through hole in a state where the connection part has been connected to the valve stem; a second position where the valve closes the through hole in a state where the connection part has been connected to the valve stem; and a third position where the connection part is removed from the valve stem and also the cap is separated from the container in a state where the valve has closed the through hole, wherein:
the valve body comprises a bottom surface configured to form a valve seat, a valve guide formed to protrude from the bottom surface toward the entrance of the container, the through hole formed to pass through an area around the valve guide, and the valve inserted into the valve guide;
the valve body further comprises a cylindrical outer wall formed to extend from the bottom surface, and a second outer wall configured to form an annular space, open toward the bottom surface, at a lower end of the outer wall; and
an outer circumferential surface of the outer wall is provided with a first screw portion to which the cap is coupled, and an inner circumferential surface of the second outer wall is provided with a second screw portion to be engaged with the screw portion of the entrance of the container or a protrusion to be caught on a projection formed on the entrance of the container.

8. A container lid having a variable measuring function, the container lid comprising:
a valve body configured to be mounted on an entrance of a container, to have a first through hole that communicates with an internal space of the container, and to have a valve that closes or opens the first through hole; and
an intermediate cap configured to be screwed on the entrance of the container, and to have a partition on which a connection part configured to be connected to or separated from a valve stem of the valve is formed, and to have a depressed variable measuring space that communicates with a second through hole formed in the partition; and
a variable cap configured to be coupled to the intermediate cap so that a depth to which the variable cap is inserted into the variable measuring space is adjustable;
wherein the intermediate cap is placed in any one of: a first position where the valve opens the first through hole in a state where the connection part has been connected to the valve stem; a second position where the valve closes the first through hole in a state where the connection part has been connected to the valve stem; and a third position where the connection part is removed from the valve stem and also the intermediate cap is separated from the container in a state where the valve has closed the first through hole.

9. The container lid of claim 8, wherein the valve body comprises a bottom surface configured to form a valve seat, a valve guide formed to protrude from the bottom surface toward the entrance of the container, the first through hole formed to pass through an area around the valve guide, and the valve inserted into the valve guide.

10. The container lid of claim 9, wherein:
the valve body further comprises a cylindrical outer wall formed to extend from the bottom surface, and a second outer wall configured to concentrically extend downward from a point below an upper end of the outer wall and to form an annular space open toward the bottom surface; and
an exposed outer circumferential surface of the outer wall is provided with a first screw portion to which the intermediate cap is coupled, and an inner circumferential surface of the second outer wall is provided with a second screw portion to be engaged with a screw portion of the entrance of the container.

11. The container lid of claim 9, wherein a protrusion is formed along an inner circumferential surface outside a lower end of the intermediate cap at the lower end of the intermediate cap, and a location where the protrusion comes into contact with a counterpart protrusion provided below a lowermost end thread of the first screw portion on which the intermediate cap is screwed is the second position.

12. The container lid of claim 8, wherein a thread-free portion without a thread over a predetermined length is formed in the middle of any one side thread by which the intermediate cap and the valve body are screwed to each other, and a location where the intermediate cap is idly rotated due to the thread-free portion is the second position.

13. The container lid of claim 8, wherein at least any one of the intermediate cap and the variable cap is made of transparent material, and a graduated ruler indicative of measuring capacity corresponding to a depth to which the variable cap is inserted is marked on an outer circumferential surface or inner circumferential surface of the variable cap.

* * * * *